(12) United States Patent
Seiki et al.

(10) Patent No.: US 9,238,208 B2
(45) Date of Patent: Jan. 19, 2016

(54) CO SHIFT REACTION APPARATUS AND GASIFICATION GAS REFINING SYSTEM

(71) Applicant: MITSUBISHI HEAVY INDUSTRIES, LTD., Tokyo (JP)

(72) Inventors: Yoshio Seiki, Tokyo (JP); Shuji Fujii, Tokyo (JP); Koji Higashino, Tokyo (JP); Kaori Yoshida, Tokyo (JP); Masaki Yushima, Hiroshima (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 14/371,367

(22) PCT Filed: Feb. 8, 2013

(86) PCT No.: PCT/JP2013/053139
§ 371 (c)(1),
(2) Date: Jul. 9, 2014

(87) PCT Pub. No.: WO2013/129086
PCT Pub. Date: Sep. 6, 2013

(65) Prior Publication Data
US 2014/0356238 A1    Dec. 4, 2014

(30) Foreign Application Priority Data
Feb. 27, 2012 (JP) ................. 2012-040716

(51) Int. Cl.
*B01J 8/04* (2006.01)
*B01J 8/00* (2006.01)
*B01J 8/02* (2006.01)
*C10K 1/00* (2006.01)
*C10K 3/04* (2006.01)
*C01B 3/16* (2006.01)
*B01J 19/00* (2006.01)
*B01J 19/24* (2006.01)
*C10K 3/02* (2006.01)
*C10K 3/00* (2006.01)
*C01B 3/02* (2006.01)
*C01B 3/06* (2006.01)
*C01B 3/12* (2006.01)
*C10J 3/46* (2006.01)

(52) U.S. Cl.
CPC ............ *B01J 8/005* (2013.01); *B01J 8/0278* (2013.01); *B01J 8/0457* (2013.01); *B01J 8/0492* (2013.01); *C01B 3/16* (2013.01); *C10K 1/003* (2013.01); *C10K 3/04* (2013.01); *B01J 2208/00061* (2013.01); *B01J 2208/00548* (2013.01); *B01J 2219/002* (2013.01); *B01J 2219/00213* (2013.01); *B01J 2219/00231* (2013.01); *C01B 2203/0283* (2013.01); *C01B 2203/0415* (2013.01); *C01B 2203/0465* (2013.01); *C01B 2203/0485* (2013.01); *C01B 2203/146* (2013.01); *C10J 3/466* (2013.01); *C10J 2300/093* (2013.01); *C10J 2300/0959* (2013.01); *C10J 2300/1653* (2013.01); *C10J 2300/1678* (2013.01); *Y02E 20/16* (2013.01); *Y02E 20/18* (2013.01)

(58) Field of Classification Search
CPC ............ B01J 8/00; B01J 8/005; B01J 8/02; B01J 8/0278; B01J 8/04; B01J 8/0446; B01J 8/0449; B01J 8/0457; B01J 8/0492; B01J 19/00; B01J 19/24; B01J 2208/00–2208/00044; B01J 2208/00061; B01J 2208/00548; B01J 2219/00049; B01J 2219/00191; B01J 2219/00211; B01J 2219/00213; B01J 2219/00222–2219/00231; C01B 3/00; C01B 3/02; C01B 3/06; C01B 3/12; C01B 3/16; C10J 3/46; C10J 3/446; C10J 2300/09; C10J 2300/0913; C10J 2300/093; C10J 2300/0959; C10J 2300/16; C10J 2300/164; C10J 2300/1643; C10J 2300/1653; C10J 2300/1678; C10K 1/00; C10K 1/002; C10K 1/003; C10K 3/02; C10K 3/04; Y02E 20/00–20/18
See application file for complete search history.

(56) References Cited

U.S. PATENT DOCUMENTS

| | | | |
|---|---|---|---|
| 4,153,580 A | 5/1979 | Hausberger et al. | |
| 4,233,180 A | 11/1980 | Hausberger et al. | |

FOREIGN PATENT DOCUMENTS

| | | | |
|---|---|---|---|
| JP | 56-062888 A | | 5/1981 |
| JP | 58-167687 A | | 10/1983 |
| JP | 59-002537 B2 | | 1/1984 |
| JP | 03-074493 A | | 3/1991 |
| JP | 04-066611 B2 | | 10/1992 |
| JP | 07216368 A | * | 8/1995 |
| JP | 2004-331701 A | | 11/2004 |
| JP | 2011-157486 A | | 8/2011 |
| WO | 2011-105501 A1 | | 9/2011 |

OTHER PUBLICATIONS

Machine translation of JP 7-216368 A, which was published on Aug. 15, 1995.*

Written Opinion, dated May 14, 2013, issued in corresponding application No. PCT/JP2013/053139, w/English translation.

International Search Report, dated May 14, 2013, issued in corresponding application No. PCT/JP2013/053139.

Written Opinion, dated May 14, 2013, issued in corresponding application No. PCT/JP2013/053139.

Notice of Acceptance dated Sep. 18, 2015, issued in counterpart Australian Application No. 2013227680. (43 pages).

* cited by examiner

*Primary Examiner* — Natasha Young

(74) *Attorney, Agent, or Firm* — Westerman, Hattori, Daniels & Adrian, LLP

(57) ABSTRACT

A CO shift reaction apparatus 11 according to the present invention includes: adiabatic reactors 31A to 31C, each having CO shift catalyst layers 35A to 35C filled with a CO shift catalyst 34 which reforms CO in gasification gas 15; gas supply lines $l_{11}$ to $l_{15}$ which supply the gasification gas 15 to the adiabatic reactors 31A to 31C; first gas flow rate control units 32A and 32B which adjust the amounts of gas supplied to the adiabatic reactors 31A to 31C; gas discharge lines $l_{21}$ to $l_{25}$ which discharge processing gas; and second gas flow rate control unit 33A and 33B which adjust flow rates of processing gas 38A-1, 38A-2, 38B-1, and 38B-2.

3 Claims, 7 Drawing Sheets

CO SHIFT REACTION APPARATUS AND GASIFICATION GAS REFINING SYSTEM

FIELD

The present invention relates to a CO shift reaction apparatus and a gasification gas refining system.

BACKGROUND

In recent years, the effective use of coal has received attention, and from now on, it is predicted that the demand for a clean coal utilization process will be increased. In order to convert coal into a high value-added energy medium, advanced technologies such as a technology of gasifying coal and a technology of refining the gasified coal are used.

In a process of refining coal gasification gas (gasification gas) made by gasifying coal, which has received attention as one of technologies to cope with such a system, as in the following reaction formula (1), a CO shift reaction in which carbon monoxide (CO) reacts with water to produce hydrogen ($H_2$) and carbon dioxide ($CO_2$) is applied (for example, refer to Patent Literatures 1 and 2).

$$CO + H_2O \rightarrow H_2 + CO_2 \qquad (1)$$

A power generation plant which applies refined gas obtained by subjecting gasification gas to the CO shift reaction as described above and refining the resultant, as gas for the turbine, and a chemical product synthesis plant which uses the refined gas as a raw material for synthesizing chemical products such as methanol and ammonia has been suggested. As the power generation plant which uses and applies the gasification gas to power generation, for example, a coal gasification combined power generation (Integrated coal Gasification Combined Cycle (IGCC)) system has been suggested (for example, refer to Patent Literatures 3 and 4). The IGCC system is referred to as a system in which coal is converted into combustible gas in a gasification furnace at a high temperature and a high pressure to produce gasification gas and the gasification gas is used as the raw material in a gas turbine and a steam turbine for combined power generation.

In order to refine the coal gasification gas and produce the refined gas, a CO shift catalyst which accelerates the reaction in which CO contained in the gasification gas is reformed and converted into $CO_2$ (CO shift reaction) is used. The coal gasification gas is allowed to pass through a CO shift reaction apparatus having a plurality of reactors provided with CO shift catalyst layers filled with the CO shift catalyst, and the CO shift reaction as in the above formula (1) occurs in the presence of the CO shift catalyst in the reactors of the CO shift reaction apparatus, thereby producing reformed gas.

In general, in order to produce the reformed gas by the CO shift reaction in the reactor, the CO shift catalyst needs to be limited to a predetermined temperature range (for example, 250° C. to 350° C.) in which the CO shift catalyst is usable. Therefore, the CO shift reaction apparatus is provided with a plurality of groups of a reactor and a cooler and is adjusted to allow the reaction to proceed while the temperature of the CO shift catalyst is in the predetermined temperature range (250° C. to 350° C.).

CITATION LIST

Patent Literature

Patent Literature 1: JP 59-2537 B
Patent Literature 2: JP 4-66611 B
Patent Literature 3: JP 2004-331701 A
Patent Literature 4: JP 2011-157486 A

SUMMARY

Technical Problem

Here, since the CO shift reaction is an exothermic reaction, the gasification gas is heated by the CO shift reaction in the CO shift reaction apparatus and thus the CO shift catalyst is heated. When the temperature of the CO shift catalyst is increased and the temperature of the CO shift catalyst exceeds a predetermined temperature, the CO shift catalyst deteriorates and needs to be replaced in early stages. Therefore, in a case where the CO shift reaction is allowed to proceed while the CO shift catalyst is in the predetermined temperature range (for example, 250° C. to 350° C.), the CO shift reaction apparatus needs to use a number of reactors and coolers in order to suppress the deterioration of the CO shift catalyst.

In addition, the size of the cooler is generally determined and manufactured based on the gas flow rate in the plan of the original design. Accordingly, there may be cases where the coal gasification gas cannot be sufficiently cooled due to variations in the gas flow rate and the gas composition of the coal gasification gas. Therefore, when the gas flow rate and the gas composition of the coal gasification gas are in a range that is too distant from the conditions of the original design, there may be cases where the cooler cannot cool the coal gasification gas while the CO shift catalyst is in the predetermined temperature range.

Accordingly, the appearance of a CO shift reaction apparatus is desirable, which is capable of allowing a CO shift catalyst to be in a predetermined temperature range even in a case where the gas flow rate and the gas composition of gasification gas vary, thereby suppressing the deterioration of the CO shift catalyst, efficiently and stably producing reformed gas, and flexibly coping with variations in the gas flow rate and the gas composition in coal gasification gas.

The present invention has been made taking the forgoing problems into consideration, and an object thereof is to provide a CO shift reaction apparatus and a gasification gas refining system capable of efficiently producing reformed gas while suppressing the deterioration of a CO shift catalyst, and flexibly coping with variations in the gas flow rate and the gas composition in coal gasification gas.

Solution to Problem

According to a first aspect of the present invention in order to solve the problems, there is provided a CO shift reaction apparatus including: a plurality of reactors, each having CO shift catalyst layers filled with a CO shift catalyst which reforms CO in gas containing CO; at least one gas supply line which supplies the gas to each of the reactors; at least one first gas flow rate control unit which is provided in the gas supply line and adjusts a gas supply amount of the gas supplied to each of the reactors; a gas discharge line which discharges processing gas in which CO in the gas is at least partially reformed, from the reactors; at least one gas separation line which connects the gas supply line to the gas discharge line and extracts a part of the processing gas in the gas discharge line; and at least one second gas flow rate control unit which is provided in the gas discharge line and adjusts a gas supply amount of the processing gas supplied to the gas discharge line and the gas separation line.

According to a second aspect of the present invention, there is provided the CO shift reaction apparatus according to the first aspect, wherein lengths of the CO shift catalyst layers are different from each other.

According to a third aspect of the present invention, there is provided a gasification gas refining system including: the CO shift reaction apparatus according to the first or second aspect, which converts CO in gasification gas produced by gasifying coal as a raw material in a gasification furnace into $CO_2$ in the presence of the CO shift catalyst; a wet flue gas processing apparatus which purifies the gasification gas after being subjected to a CO shift reaction in the CO shift reaction apparatus; and a refining apparatus which performs refinement by removing carbon dioxide and hydrogen sulfide from the gasification gas after being purified by the wet flue gas processing apparatus.

Advantageous Effects of Invention

According to the present invention, the reformed gas can be efficiently produced while suppressing the deterioration of the CO shift catalyst, and variations in the gas flow rate, the gas composition, and the like of coal gasification gas can be flexibly coped with.

Accordingly, an increase in the lifespan of the CO shift catalyst becomes possible and the catalyst performance of the CO shift catalyst can be held for a longer term. Therefore, a gas refining process can be performed more efficiently and stably.

DESCRIPTION OF EMBODIMENTS

Hereinafter, the present invention will be described in detail with reference to the drawings. In addition, the present invention is not limited by the following embodiments. The constituent elements in the following embodiments include elements that can be easily postulated by those in the art, practically the same elements, and elements in a so-called equivalent range. Furthermore, the constituent elements disclosed in the following embodiments can be appropriately combined.

Embodiments

Gasification Gas Refining System

Figure 1:
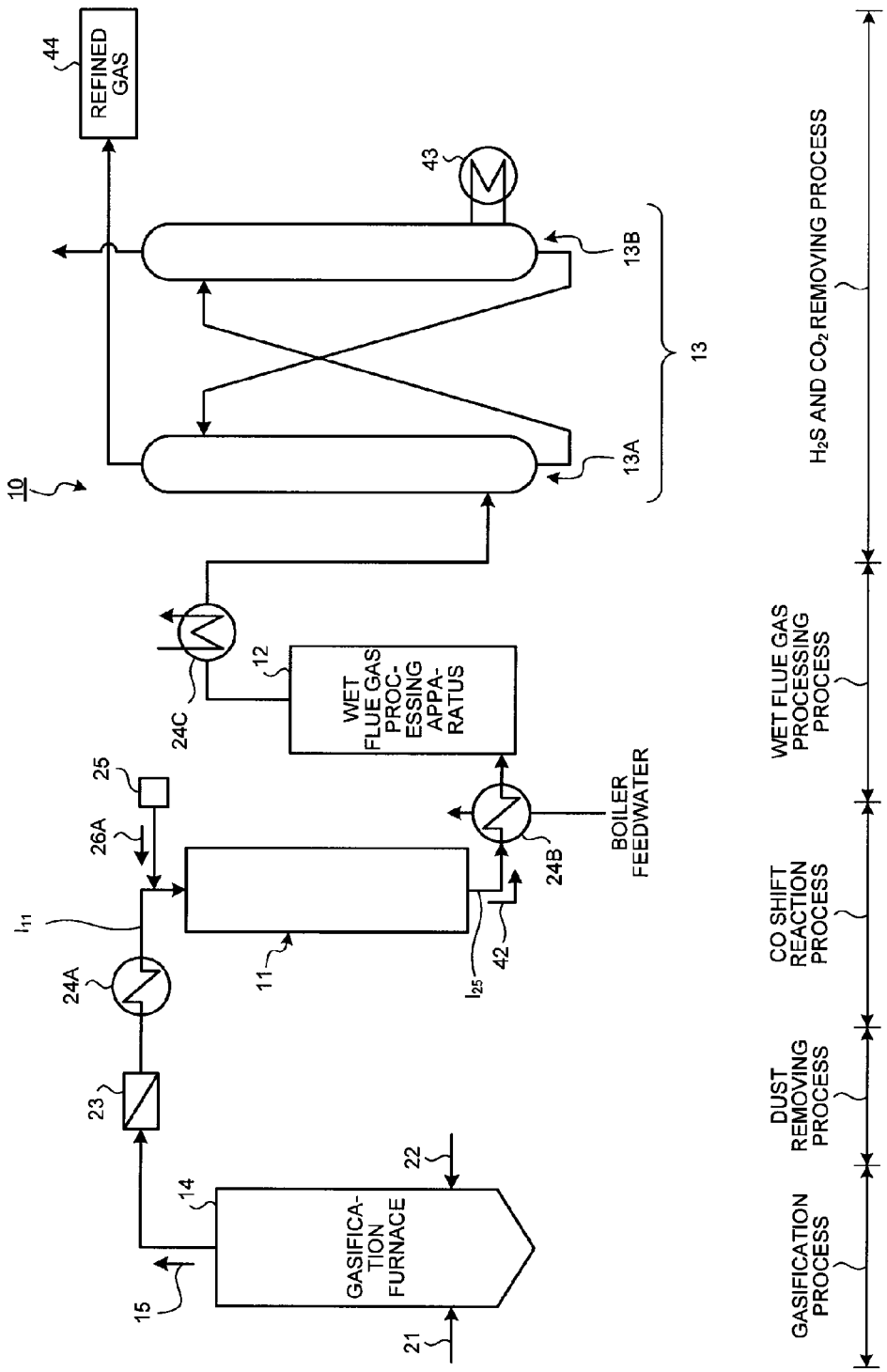
FIG. 1 is a schematic diagram illustrating a gasification gas refining system to which a CO shift reaction apparatus according to an embodiment of the present invention is applied.

A CO shift reaction apparatus according to an embodiment of the present invention will be described with reference to the drawings. FIG. 1 is a schematic diagram illustrating a gasification gas refining system to which the CO shift reaction apparatus according to the embodiment of the present invention is applied. As illustrated in FIG. 1, a gasification gas refining system 10 includes a CO shift reaction apparatus 11, a wet flue gas processing apparatus 12, and an $H_2S/CO_2$ recovery unit 13. The gasification gas refining system 10 refines coal gasification gas (gasification gas) 15 produced in a gasification furnace 14. The gasification gas refining system 10 includes a CO shift reaction process performed in the CO shift reaction apparatus 11, a wet flue gas processing process performed in the wet flue gas processing apparatus 12, and an $H_2S$ and $CO_2$ removing process performed in the $H_2S/CO_2$ recovery unit 13.

Coal 21 as the raw material is caused to come into contact with a gasifying agent 22 such as air or oxygen in the gasification furnace 14 so as to be combusted and gasified, thereby producing the coal gasification gas (gasification gas) 15 (gasification process). The gasification gas 15 produced in the gasification furnace 14 mainly contains carbon monoxide (CO), hydrogen ($H_2$), and carbon dioxide ($CO_2$) but also contains a small amount of elements contained in the coal 21 (for example, halogen compounds and heavy metals such as mercury (Hg)), a small amount of compounds uncombusted during coal gasification (for example, phenol, polycyclic aromatic compounds such as anthracene, cyan, and ammonia), and the like.

The gasification gas 15 produced in the gasification furnace 14 is supplied from the gasification furnace 14 to a dust removing apparatus 23. From the gasification gas 15 supplied to the dust removing apparatus 23, soot and dust in the gasification gas 15 is removed (dust removing process). The dust removing apparatus 23 is an apparatus that removes soot and dust contained in the gasification gas 15 through a cyclone, a filter, or the like and specific examples thereof include an electrostatic precipitator (EP), a fixed bed filter, and a moving bed filter.

After soot and dust in the gasification gas 15 is removed by the dust removing apparatus 23, the gasification gas 15 is cooled by a heat exchanger 24A. Thereafter, the gasification gas 15 is supplied to the CO shift reaction apparatus 11 after steam 26A is supplied from a steam supply apparatus (steam supply unit) 25 via a gas supply line $l_{11}$. Accordingly, moisture needed for a CO shift reaction is supplied to the gasification gas 15.

CO Shift Reaction Apparatus

Figure 2:
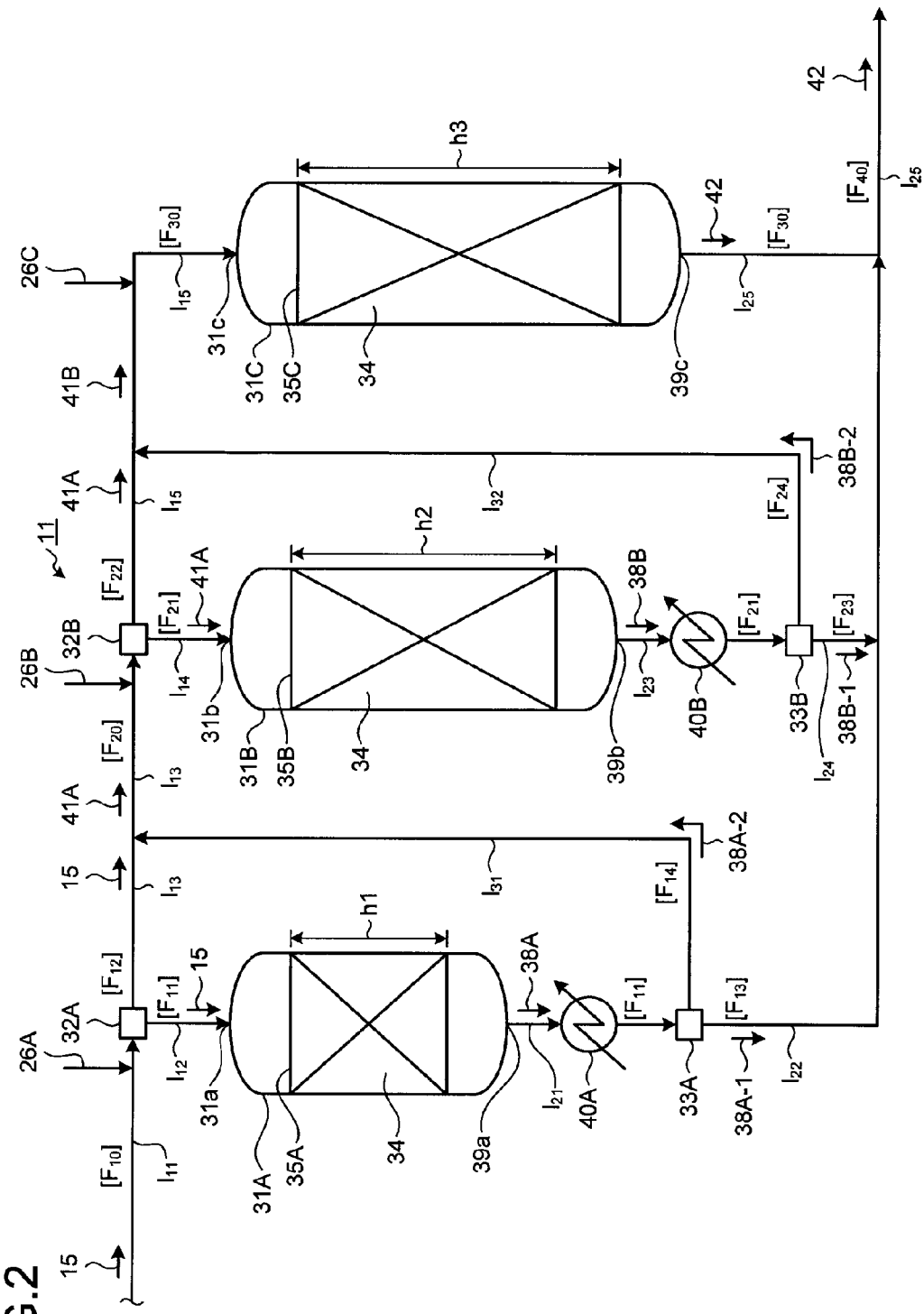
FIG. 2 is a schematic diagram illustrating the configuration of the CO shift reaction apparatus according to the embodiment.

The CO shift reaction apparatus 11 is an apparatus which reforms carbon monoxide (CO) in the gasification gas 15 to be converted into carbon dioxide ($CO_2$) in the presence of a CO shift catalyst. FIG. 2 is a schematic diagram illustrating the configuration of the CO shift reaction apparatus 11 according to this embodiment. As illustrated in FIG. 2, the CO shift reaction apparatus 11 includes adiabatic reactors (reactors) 31A to 31C, gas supply lines $l_{11}$ to $l_{15}$, first gas flow rate control units 32A and 32B, gas discharge lines $l_{21}$ to $l_{25}$, gas separation lines $l_{31}$ and $l_{32}$, and second gas flow rate control units 33A and 33B. In this embodiment, the CO shift reaction apparatus 11 is provided with three adiabatic reactors but a larger number of adiabatic reactors may also be provided.

The adiabatic reactors 31A to 31C include CO shift catalyst layers 35A to 35C filled with a CO shift catalyst 34 which performs a so-called CO shift reaction in which CO in the gasification gas 15 is reformed such that CO is converted into $CO_2$.

In the CO shift reaction, $H_2$ and $CO_2$ as effective components are obtained from CO and $H_2O$ through the reaction of the following reaction formula (1) in the presence of the CO shift catalyst 34.

$$CO + H_2O \rightarrow H_2 + CO_2 \qquad (1)$$

In addition, the steam 26A needed for the CO shift reaction is supplied into the CO shift reaction apparatus 11 along with the gasification gas 15 via the gas supply line $l_{11}$.

As the CO shift catalyst 34 which accelerates the CO shift reaction of the above formula (1), catalysts well known hitherto may be used and the CO shift catalyst 34 is not particularly limited.

As the CO shift catalyst 34, a catalyst which carries an active component in a carrier is used. As the active component, any one type or a mixture of molybdenum (Mo), iron (Fe), cobalt (Co), platinum (Pt), nickel (Ni), ruthenium (Ru), iridium (Ir), and rhodium (Rh) may be employed. As the carrier, at least one type of titanium (Ti), aluminum (Al), silicon (Si), zirconium (Zr), cerium (Ce), and the like or an oxide of a mixture or compound in which such elements are present may be employed. The active component and the carrier may include any one type or two or more types of the elements.

As the carrier, oxides of $TiO_2$, $Al_2O_3$, $SiO_2$, $ZrO_2$, and $CeO_2$ are preferable. In addition, the carrier may also include a composite oxide in which at least two types thereof or two or more types of elements are present. In addition, a case where a composite oxide and a mixture coexist may also be included. As the composite oxide, for example, there are $TiO_2$—$ZrO_2$, $TiO_2$—$Al_2O_3$, $TiO_2$—$SiO_2$, $TiO_2$—$CeO_2$, $CeO_2$—$ZrO_2$, $ZrO_2$—$Al_2O_3$, and $SiO_2$—$ZrO_2$. Moreover, a composite oxide in which any of the oxides $TiO_2$, $SiO_2$, $ZrO_2$, and $CeO_2$ is combined with $Al_2O_3$, for example, $TiO_2$—$Al_2O_3$ or $ZrO_2$—$Al_2O_3$ may also be exemplified.

It is preferable that a catalyst having resistance to halogen compounds be used as the CO shift catalyst 34. Since the CO shift catalyst 34 has resistance to the halogen compounds contained in the gasification gas 15, the CO shift catalyst 34 does not deteriorate even when halogen compounds and the like are contained in the gasification gas 15, and CO contained in the gasification gas 15 can be converted into $CO_2$ (CO shift reaction).

In addition, the CO shift catalyst 34 may also be subjected to sulfuric acid treatment so as to be provided with resistance to sulfur components. As a method of performing the sulfuric acid treatment, for example, there is a treatment method of immersing or dropping a catalyst into a sulfuric acid-based aqueous solution such as sulfuric acid or thiosulfuric acid, drying the resultant, and thereafter drying the resultant in a heating furnace at a high temperature (about 500 to 600° C.) atmosphere to cause the catalyst to contain sulfate radicals. As a specific treatment method, the catalyst is introduced into sulfuric acid with a predetermined concentration, filtered, dried, and thereafter baked at 600° C. As the sulfate radicals or a precursor of the sulfate radicals, there are sulfuric acid ($H_2SO_4$), ammonium sulfate [$(NH_4)_2SO_4$], ammonium sulfite [$(NH_4)_2SO_3$], ammonium hydrogen sulfate [$(NH_4)HSO_4$], sulfuryl chloride ($SO_2Cl_2$), and the like. Particularly preferably, sulfuric acid, ammonium sulfate, and sulfuryl chloride are appropriate.

The CO shift catalyst 34 exhibits the catalyst function in a predetermined temperature range, and as the predetermined temperature range, for example, a range of 230° C. or higher and 500° C. or lower is preferable, a range of 250° C. or higher and 400° C. or lower is more preferable, and a range of 250° C. or higher and 350° C. or lower is even more preferable.

Respective longitudinal lengths h1 to h3 of the CO shift catalyst layers 35A to 35C are preferably reduced as the amounts of initial gasification gas 15 supplied to the CO shift catalyst layers, which is supplied into the CO shift reaction apparatus 11, are increased. In this embodiment, the respective longitudinal lengths h1 to h3 of the CO shift catalyst layers 35A to 35C are increased in the order of the CO shift catalyst layers 35A to 35C. As the longitudinal length of the CO shift catalyst layer (in this embodiment, the CO shift catalyst layer 35A) to which a larger amount of the initial gasification gas 15 is supplied, which is supplied into the CO shift reaction apparatus 11, is increased, the CO shift reaction in which CO in the gasification gas 15 is converted into $CO_2$ in the CO shift catalyst layer proceeds for a longer time. In addition, the CO shift reaction is an exothermic reaction. Therefore, as the longitudinal length of the CO shift catalyst layer (in this embodiment, the CO shift catalyst layer 35A) to which a larger amount of the initial gasification gas 15 is supplied, which is supplied into the CO shift reaction apparatus 11, is increased, the temperature of the CO shift catalyst easily exceeds the heat resistant temperature. Accordingly, in this embodiment, the respective longitudinal lengths h1 to h3 of the CO shift catalyst layers 35A to 35C are increased in the order of the CO shift catalyst layers 35A, 35B, and 35C.

Regarding the ratio of the longitudinal lengths h1 to h3 of the catalyst layers of the CO shift catalyst layers 35A to 35C, for example, when the length h1 of the catalyst layer of the CO shift catalyst layer 35A is assumed to be 1, the length h2 of the catalyst layer of the CO shift catalyst layer 35B is preferably 1 or greater and 2.5 or less, and the length h3 of the catalyst layer of the CO shift catalyst layer 35C is preferably 1.5 or greater and 3 or less.

A process of processing the gasification gas 15 supplied to the CO shift reaction apparatus 11 will be described. The gasification gas 15 supplied to the CO shift reaction apparatus 11 passes through the gas supply line $l_{11}$ and is separated by the first gas flow rate control unit 32A to be supplied to the gas supply lines $l_{12}$ and $l_{13}$, and the amount of the gasification gas 15 supplied to each of the lines is adjusted. A gas supply amount $F_{11}$ of the gasification gas 15 supplied to the gas supply line $l_{12}$ side and a gas supply amount $F_{12}$ supplied to the gas supply line $l_{13}$ side may be adjusted in a range in which the CO shift catalyst 34 in the CO shift catalyst layer 35A does not exceed a predetermined temperature (for example, 350° C.)

Figure 3:
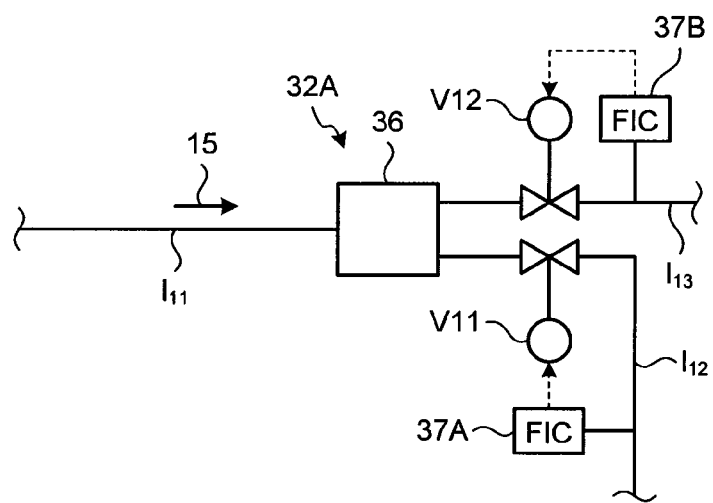
FIG. 3 is a diagram illustrating an example of a gas flow rate controller.

An example of the first gas flow rate control unit 32A is illustrated in FIG. 3. As illustrated in FIG. 3, the first gas flow rate control unit 32A includes a gas fractionation unit 36 for adjusting the gas supply amounts of the gasification gas 15 supplied to the gas supply lines $l_{12}$ and $l_{13}$, gas flow rate control valves V11 and V12 which adjust the gas flow rates of the gas supply lines $l_{12}$ and $l_{13}$, and gas flow rate control meters (FIC) 37A and 37B.

In this embodiment, the first gas flow rate control unit 32A adjusts the gas supply amount $F_{10}$ of the gasification gas 15 that passes through the gas supply line $l_{11}$ so that the gas supply amount $F_{11}$ that passes through the gas supply line $l_{12}$ and the gas supply amount $F_{12}$ that passes through the gas supply line $l_{13}$ have a ratio in a range of 9:1 to 6:4 by the first gas flow rate control unit 32A.

The gasification gas 15 supplied to the gas supply line $l_{12}$ side is supplied into the adiabatic reactor 31A from a gas inlet port 31a and passes through the CO shift catalyst layer 35A. As the gasification gas 15 passes through the CO shift catalyst layer 35A, the CO shift reaction is accelerated. The gasification gas 15 that passes through the CO shift catalyst layer 35A is discharged to the gas discharge line $l_{21}$ from a gas discharge port 39a of the adiabatic reactor 31A as processing gas 38A. The processing gas 38A at a high temperature, which is discharged from the adiabatic reactor 31A, passes through the gas discharge line $l_{21}$ and is cooled by a heat exchanger 40A, and the amounts of the processing gas 38A supplied to the gas discharge line $l_{22}$ and the gas separation line $l_{31}$ are adjusted by the second gas flow rate control unit 33A. A gas supply amount $F_{13}$ supplied to the gas discharge line $l_{22}$ side and a gas supply amount $F_{14}$ supplied to the gas separation line $l_{31}$ side are appropriately and arbitrarily adjusted.

In this embodiment, the second gas flow rate control unit 33A adjusts the gas supply amount $F_{11}$ of the processing gas 38A that passes through the gas discharge line $l_{21}$ so that the gas supply amount $F_{13}$ of processing gas 38A-1 that passes through the gas discharge line $l_{22}$ and the gas supply amount $F_{14}$ of processing gas 38A-2 that passes through the gas separation line $l_{31}$ have a ratio in a range of 1:9 to 4:6 by the second gas flow rate control unit 33A.

The gas separation line $l_{31}$ connects the gas discharge line $l_{21}$ to the gas supply line $l_{12}$ such that the processing gas 38A-2 supplied to the gas separation line $l_{31}$ side passes through the gas separation line $l_{31}$ and is mixed with the gasification gas 15 in the gas supply line $l_{13}$.

Gasification mixed gas 41A having the processing gas 38A-2 and the gasification gas 15 mixed with each other is separated by the first gas flow rate control unit 32B to be supplied to the gas supply lines $l_{14}$ and $l_{15}$ after steam 26B is supplied from the steam supply unit 25 to the gas supply line $l_{13}$ as necessary, and the amount of the gasification mixed gas 41A supplied to each of the lines is adjusted. A gas supply amount $F_{21}$ of the gasification mixed gas 41A supplied to the gas supply line $l_{14}$ and a gas supply amount $F_{22}$ supplied to the gas supply line $l_{15}$ side may be adjusted in a range in which the CO shift catalyst 34 in the CO shift catalyst layer 35B does not exceed a predetermined temperature (for example, 350° C.)

In this embodiment, the first gas flow rate control unit 32B adjusts the gas supply amount $F_{20}$ of the gasification mixed gas 41A that passes through the gas supply line $l_{13}$ so that the gas supply amount $F_{21}$ of the gasification mixed gas 41A that passes through the gas supply line $l_{14}$ and the gas supply amount $F_{22}$ of the gasification mixed gas 41A that passes through the gas supply line $l_{15}$ have a ratio in a range of 9:1 to 6:4 by the first gas flow rate control unit 32B.

The gasification mixed gas 41A supplied to the gas supply line $l_{14}$ side is supplied into the adiabatic reactor 31B from a gas inlet port 31b and passes through the CO shift catalyst layer 35B. As the gasification mixed gas 41A passes through the CO shift catalyst layer 35B, the next CO shift reaction is accelerated. The gasification mixed gas 41A that passes through the CO shift catalyst layer 35B is discharged to the gas discharge line $l_{23}$ from a gas discharge port 39b of the adiabatic reactor 31B as processing gas 38B.

The processing gas 38B at a high temperature, which is discharged from the adiabatic reactor 31B, passes through the gas discharge line $l_{23}$ and is cooled by a heat exchanger 40B, and the amounts of the processing gas 38B supplied to the gas discharge line $l_{24}$ and the gas separation line $l_{32}$ are adjusted by the second gas flow rate control unit 33B. A gas supply amount $F_{23}$ supplied to the gas discharge line $l_{24}$ side and a gas supply amount $F_{24}$ supplied to the gas separation line $l_{32}$ side are appropriately and arbitrarily adjusted.

In this embodiment, the second gas flow rate control unit 33B adjusts the gas supply amount $F_{21}$ of the processing gas 38B so that the gas supply amount $F_{23}$ and the gas supply amount $F_{24}$ have a ratio in a range of 1:9 to 4:6 by the second gas flow rate control unit 33B.

The gas separation line $l_{32}$ connects the gas discharge line $l_{23}$ to the gas supply line $l_{15}$ such that processing gas 38B-2 supplied to the gas separation line $l_{32}$ side passes through the gas separation line $l_{32}$ and is mixed with the gasification mixed gas 41A in the gas supply line $l_{15}$.

A gasification mixed gas 41B having the gasification mixed gas 41A and the processing gas 38B-2 mixed with each other is supplied with steam 26C from the steam supply unit 25 in the gas supply line $l_{15}$ as necessary. Thereafter, the gasification mixed gas 41B is supplied into the adiabatic reactor 31C from a gas inlet port 31c and passes through the CO shift catalyst layer 35C. As the gasification mixed gas 41B passes through the CO shift catalyst layer 35C, the next CO shift reaction is accelerated. The gasification mixed gas 41B that passes through the CO shift catalyst layer 35C is discharged to the gas discharge line $l_{25}$ from a gas discharge port 39c of the adiabatic reactor 31C as reformed gas (processed gas) 42.

The gas discharge lines $l_{22}$ and $l_{24}$ are connected to the gas discharge line $l_{25}$. The processing gas 38A-1 discharged to the gas discharge line $l_{22}$ and a processing gas 38B-1 discharged to the gas discharge line $l_{24}$ are mixed with the reformed gas 42, and thereafter the mixture is discharged from the CO shift reaction apparatus 11 via the gas discharge line $l_{25}$.

As described above, the gas amount of the gasification gas 15 supplied to each of the CO shift catalyst layers 35A to 35C is appropriately adjusted depending on the gas flow rate and the gas composition of the gasification gas 15 and the gasification gas 15 passes through the CO shift catalyst layers 35A to 35C in this order to allow the conversion of CO contained in the gasification gas 15 into $CO_2$ to proceed such that the CO shift reaction proceeds, and accordingly, the reformed gas 42 is obtained.

The CO shift reaction apparatus 11 according to this embodiment adjusts the supply amount of the gasification gas 15 supplied to each of the adiabatic reactors 31A to 31C thereby efficiently producing the reformed gas 42 while suppressing the deterioration of the CO shift catalyst 34 provided in the adiabatic reactors 31A to 31C.

Next, an example of controlling the gas flow in a case where the reformed gas 42 is produced by adjusting the supply amount of the gasification gas 15 supplied to each of the adiabatic reactors 31A to 31C and the longitudinal length of the catalyst layer of each of the CO shift catalyst layers 35A to 35C, and converting CO in the gasification gas 15 into $CO_2$ will be described.

Figure 4:
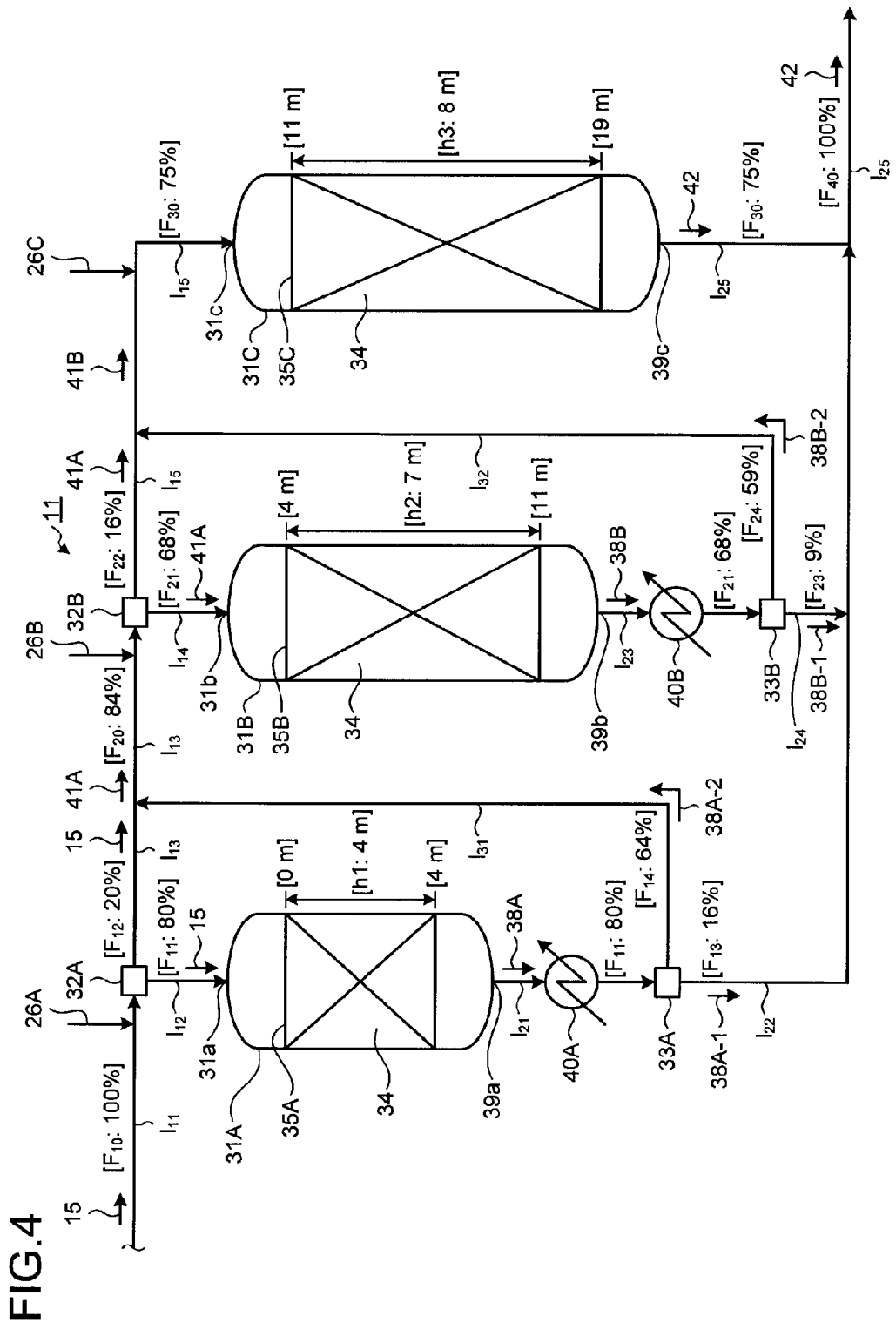
FIG. 4 is an explanatory view of an example of producing reformed gas by adjusting the supply amount of gasification gas supplied to each of adiabatic reactors.

FIG. 4 is an explanatory view of the example of producing the reformed gas 42 by adjusting the supply amount of the gasification gas 15 supplied to each of the adiabatic reactors 31A to 31C. Here, a case where the ratio of the longitudinal lengths of the catalyst layers of the CO shift catalyst layers 35A to 35C is a ratio of 1:1.75:2 (specifically, 4 m:7 m:8 m) and the gas supplied to the first gas flow rate control units 32A and 32B and the second gas flow rate control units 33A and 33B is separated at a ratio of about 8:2 will be described.

As illustrated in FIG. 4, when the gas supply amount $F_{10}$ of the gasification gas 15 that passes through the gas supply line $l_{11}$ and is supplied to the CO shift reaction apparatus 11 is assumed to be 100%, the gas supply amount $F_{11}$ of the gasification gas 15 supplied to the gas supply line $l_{12}$ side from the first gas flow rate control unit 32A and the gas supply amount $F_{12}$ supplied to the gas supply line $l_{13}$ side are adjusted to have a ratio of, for example, about 80%:20%.

Next, when the gas supply amount $F_{11}$ of the processing gas 38A discharged to the gas discharge line $l_{21}$ from the adiabatic reactor 31A is assumed to be 80%, the gas supply amount $F_{13}$ supplied to the gas discharge line $l_{22}$ side and the gas supply amount $F_{14}$ supplied to the gas separation line $l_{31}$ side are adjusted to have a ratio of, for example, about 16%:64% by the second gas flow rate control unit 33A.

In addition, the gas supply amount $F_{20}$ of the gasification mixed gas 41A having the processing gas 38A-2 supplied to the gas separation line $l_{31}$ side and the gasification gas 15 mixed with each other becomes 84% which is the sum of the gas supply amount $F_{12}$ of the gasification gas 15 that passes through the gas supply line $l_{13}$ side and the gas supply amount $F_{14}$ of the processing gas 38A-2 supplied to the gas separation line $l_{31}$ side. At this time, the gas supply amount $F_{21}$ of the gasification mixed gas 41A supplied to the gas supply line $l_{14}$ side and the gas supply amount $F_{22}$ supplied to the gas supply line $l_{15}$ are adjusted to have a ratio of, for example, about 68%:16% by the first gas flow rate control unit 32B.

Next, when the gas supply amount $F_{21}$ of the processing gas 38B discharged to the gas discharge line $l_{23}$ from the adiabatic reactor 31B is assumed to be 68%, the gas supply amount $F_{23}$ supplied to the gas discharge line $l_{24}$ side and the gas supply amount $F_{24}$ supplied to the gas separation line $l_{32}$ side are adjusted to have a ratio of, for example, about 9%:59% by the second gas flow rate control unit 33B.

In addition, the gas supply amount $F_{30}$ of the gasification mixed gas 41B having the processing gas 38B-2 supplied to the gas supply line $l_{15}$ side and the gasification mixed gas 41A mixed with each other becomes 75% which is the sum of the gas supply amount $F_{22}$ of the gasification mixed gas 41A that passes through the gas supply line $l_{15}$ side and the gas supply amount $F_{24}$ of the processing gas 38B-2 supplied to the gas separation line $l_{32}$ side. At this time, the gas supply amount $F_{30}$ of the reformed gas 42 discharged to the gas discharge line $l_{25}$ from the adiabatic reactor 31C becomes 75%.

The gas supply amount $F_{40}$ of the reformed gas 42 becomes 100% as the gas supply amount $F_{30}$ (75%) of the reformed gas 42, the gas supply amount $F_{13}$ (16%) supplied to the gas discharge line $l_{22}$ side, and the gas supply amount $F_{23}$ (9%) supplied to the gas discharge line $l_{24}$ side are added, and the reformed gas 42 is discharged from the CO shift reaction apparatus 11.

Figure 5:
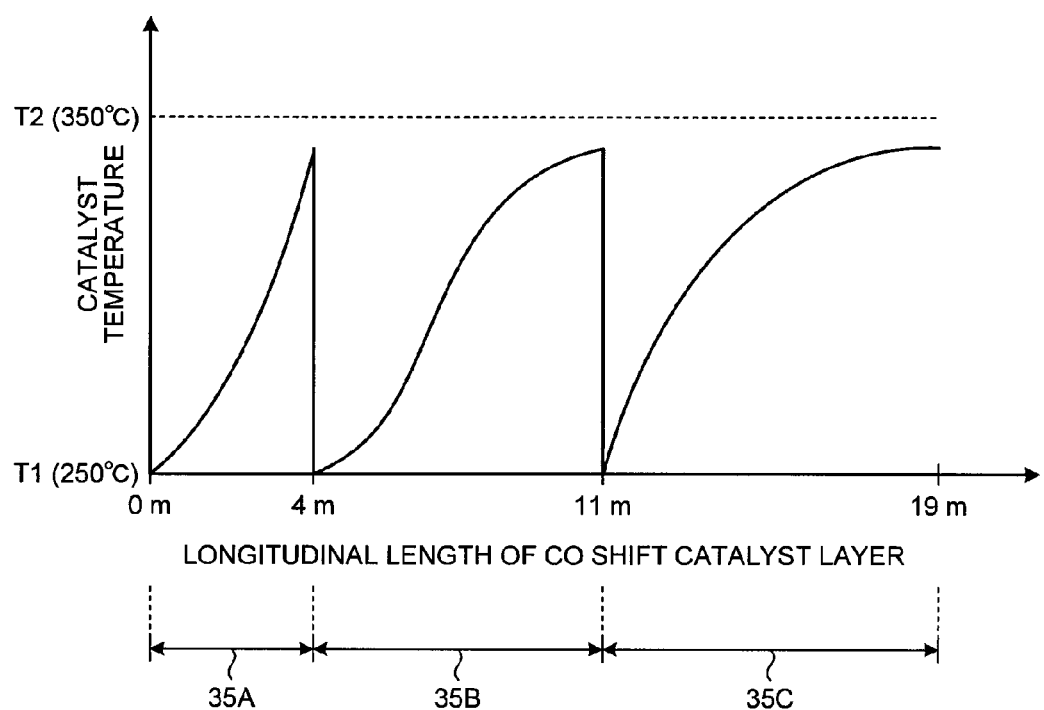
FIG. 5 is a diagram illustrating a change in the catalyst temperature of a CO shift catalyst in a case where the CO shift reaction apparatus according to the embodiment of the present invention is used.

Here, a change in the catalyst temperature of the CO shift catalyst 34 of each of the CO shift catalyst layers 35A to 35C in the CO shift reaction apparatus 11 according to this embodiment is illustrated in FIG. 5. In addition, a change in the catalyst temperature of a CO shift catalyst of each of CO shift catalyst layers in a case where the longitudinal lengths of the CO shift catalyst layers are equal to each other as 5 m and three CO shift catalyst layers are provided in series is illustrated in FIG. 6.

Figure 6:
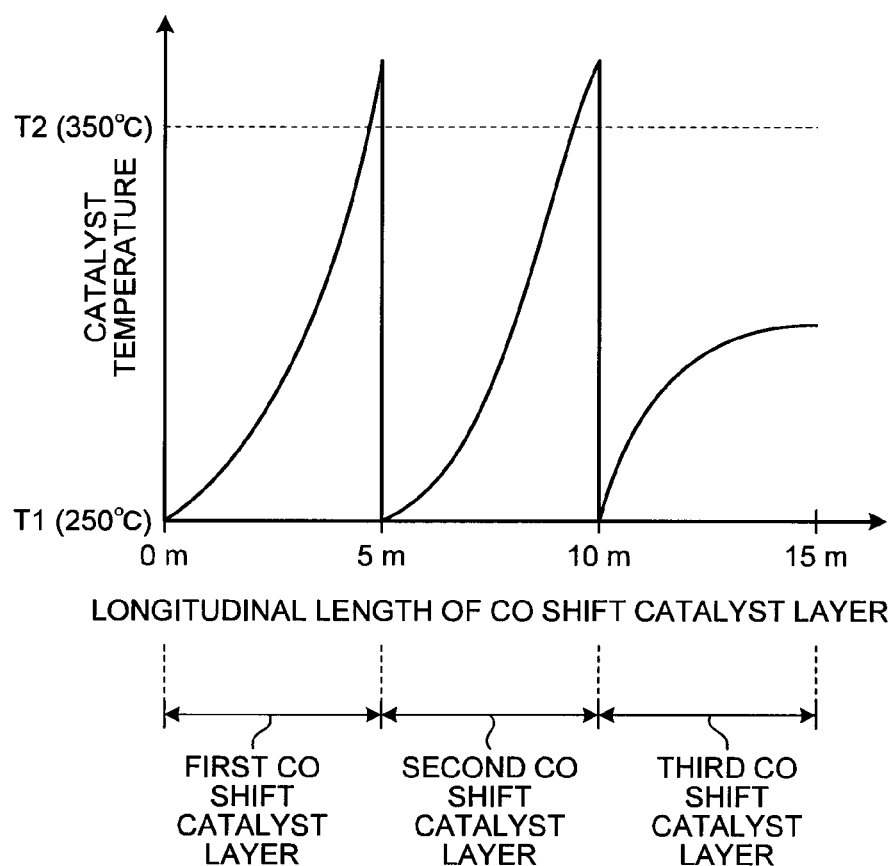
FIG. 6 is a diagram illustrating a change in the catalyst temperature of a CO shift catalyst in a case where three stages of the CO shift catalyst are used in series.

As illustrated in FIG. 6, in the case where the three CO shift catalysts are provided in series, the CO shift catalysts of a first CO shift catalyst layer on the upstream side and a second CO shift catalyst layer on the midstream side increase in temperature to T2 (for example, 350° C.) or higher, which exceeds the resistance of the CO shift catalyst, and the CO shift catalyst of a third CO shift catalyst layer on the downstream side is in a temperature range of T1 to T2 (for example, 250° C. to 350° C.) in which the activity of the CO shift catalyst can be maintained.

In contrast, as illustrated in FIG. 5, in the CO shift reaction apparatus 11 according to this embodiment, the catalyst temperature of the CO shift catalyst of each of the CO shift catalyst layers 35A to 35C is in the temperature range of T1 to T2 (for example, 250° C. to 350° C.) in which the activity of the CO shift catalyst can be maintained. In addition, the catalyst temperature of the CO shift catalyst of each of the CO shift catalyst layers 35A to 35C is a temperature close to the catalyst temperature T2 (for example, 350° C.)

Therefore, in the CO shift reaction apparatus 11 according to this embodiment, the catalyst temperature of the CO shift catalyst of each of all the CO shift catalyst layers 35A to 35C can be suppressed from increasing to be the temperature T2 (for example, 350° C.) or higher which exceeds the resistance of the CO shift catalyst. In addition, since the CO shift reaction proceeds at a higher rate as the catalyst temperature is increased, it is preferable that the catalyst temperature of the CO shift catalyst be increased as high as possible. Therefore, in the CO shift reaction apparatus 11 according to this embodiment, the CO shift reaction can be efficiently performed in all the CO shift catalyst layers 35A to 35C while considering the longitudinal length of each of the CO shift catalyst layers 35A to 35C. As a result, the reformed gas 42 can be obtained by efficiently converting CO in the gasification gas 15 into $CO_2$.

As described above, the CO shift reaction apparatus 11 according to this embodiment can efficiently produce the reformed gas 42 while suppressing the deterioration of the CO shift catalyst 34 when CO in the gasification gas 15 is converted into $CO_2$ and can flexibly cope with variations in the gas flow rate and the gas composition of the gasification gas 15. That is, since the CO shift reaction is an exothermic reaction, when a general adiabatic reactor which has been used hitherto is used, the gasification gas 15 in the vicinity of the outlet of the reactor reaches a high temperature (about 450 to 550° C.) and thus the CO shift catalyst 34 also reaches a high temperature. As a result, the degradation of the catalyst performance of the CO shift catalyst 34 and the like occur. Therefore, when the CO shift reaction is completed only by a single adiabatic reactor, the CO shift catalyst 34 reaches too high temperature due to the exothermic reaction of the CO shift reaction.

In the CO shift reaction apparatus 11 according to this embodiment, the gasification gas 15 is not collectively injected into a adiabatic reactor but is allowed to branch off to a plurality of (in this embodiment, three) adiabatic reactors to be supplied in stages so that the CO shift reaction is performed in each of the adiabatic reactors 31A to 31C. Accordingly, the temperatures of the CO shift catalyst 34 in all the CO shift catalyst layers 35A to 35C can be easily adjusted to be in the predetermined temperature range, and a wide range of the gas flow rate and the gas composition of the gasification gas 15 can be coped with. Therefore, the inside of each of the adiabatic reactors 31A to 31C can be suppressed from reaching too high temperature as the CO shift catalyst 34 in each of the adiabatic reactors 31A to 31C undergoes the CO shift reaction, and thus the deterioration of the CO shift catalyst 34 is suppressed. Accordingly, the catalyst activity is properly maintained and the stabilization of the catalyst performance can be achieved. Therefore, the CO shift reaction apparatus 11 according to this embodiment can efficiently produce the reformed gas 42 while suppressing the deterioration of the CO shift catalyst 34 and can flexibly cope with variations in the gas flow rate, the gas composition, and the like of the gasification gas 15. Accordingly, a more efficient operation of the CO shift catalyst 34 becomes possible, and appropriate conditions for the CO shift reaction can be maintained for a long term. Therefore, an increase in the lifespan of the CO shift catalyst 34 becomes possible and the catalyst performance of the CO shift catalyst 34 is further stabilized and held for a long term, thereby producing the reformed gas 42 more efficiently and stably.

Next, as illustrated in FIG. 1, the reformed gas 42 discharged from the CO shift reaction apparatus 11 passes through the gas discharge line $l_{25}$, is cooled in a heat exchanger 24B by feedwater discharged from a boiler, and is thereafter supplied to the wet flue gas processing apparatus 12. The wet flue gas processing apparatus 12 is an apparatus that removes halogen compounds, cyan, ammonia, and the like in the gasification gas 15, and specifically, a wet scrubber apparatus which uses a cleaning liquid such as water or an alkaline solution, an absorber filled with sodium fluoride (NaF) as a chemical that adsorbs hydrogen fluoride, and the like may be employed. Otherwise, a dry scrubber apparatus may be used instead of the wet scrubber apparatus.

The reformed gas 42 is discharged from the wet flue gas processing apparatus 12 after halogen compounds, cyan, ammonia, and the like in the reformed gas 42 are removed in the wet flue gas processing apparatus 12, is cooled by cooling water in a heat exchanger 24C, and is supplied to the $H_2S/CO_2$ recovery unit 13.

The $H_2S/CO_2$ recovery unit 13 is an apparatus that removes carbon dioxide ($CO_2$) and hydrogen sulfide ($H_2S$) in the gasification gas 15 and includes an absorber 13A and a regenerator 13B. In the absorber 13A, $CO_2$ and $H_2S$ in the gasification gas 15 is absorbed by an absorbent, thereby recovering $CO_2$ and $H_2S$ in the gasification gas 15. The absorbent that has absorbed $CO_2$ and $H_2S$ is supplied to the regenerator 13B. In the regenerator 13B, the absorbent is heated by a regenerating heater 43 to allow the absorbent to desorb $CO_2$ and $H_2S$, thereby regenerating the absorbent. The regenerated absorbent is circulated toward the absorber 13A and reused.

Since $CO_2$ and $H_2S$ is removed from the reformed gas 42 in the absorber 13A of the $H_2S/CO_2$ recovery unit 13, refined gas 44 which mainly contains $H_2$ is obtained. Since the refined gas 44 is gas mainly containing hydrogen ($H_2$), the refined gas 44 can be applied as gas for the turbine of a power generation plant or the raw material for synthesizing chemical products such as methanol and ammonia.

As described above, according to the gasification gas refining system 10 to which the CO shift reaction apparatus 11 according to this embodiment is applied, the CO shift reaction apparatus 11 can efficiently produce the reformed gas 42 while suppressing the deterioration of the CO shift catalyst 34 and can flexibly cope with variations in the gas flow rate, the gas composition, and the like of the gasification gas 15. Accordingly, an increase in the lifespan of the CO shift catalyst 34 becomes possible and the catalyst performance of the CO shift catalyst 34 can be held for a longer term. As a result, the reformed gas 42 can be stably obtained, and thus the production efficiency of the refined gas 44 can be increased, thereby allowing the gas refining process to be performed more efficiently and stably.

In addition, in this embodiment, the $H_2S/CO_2$ recovery unit 13 removes both $CO_2$ and $H_2S$ in the absorber 13A. However, an apparatus that removes $CO_2$ and an apparatus that removes $H_2S$ may be provided in a row to separately remove $CO_2$ and $H_2S$.

In addition, in this embodiment, the CO shift reaction apparatus 11 is provided between the dust removing apparatus 23 and the wet flue gas processing apparatus 12. However, this embodiment is not limited thereto, and the CO shift reaction apparatus 11 may also be provided between the wet flue gas processing apparatus 12 and the $H_2S/CO_2$ recovery unit 13 or on the downstream side of the $H_2S/CO_2$ recovery unit 13.

In addition, in a case where carbonyl sulfide (COS) is incorporated into the gasification gas 15, a COS conversion catalyst apparatus may be provided in any of the front and the rear of the CO shift reaction apparatus 11. Otherwise, COS may be removed by physical adsorption unit in the $H_2S/CO_2$ recovery unit 13.

Coal Gasification Power Generation Plant

A coal gasification power generation plant provided with the CO shift reaction apparatus 11 according to this embodiment will be described with reference to the drawings.

Figure 7:
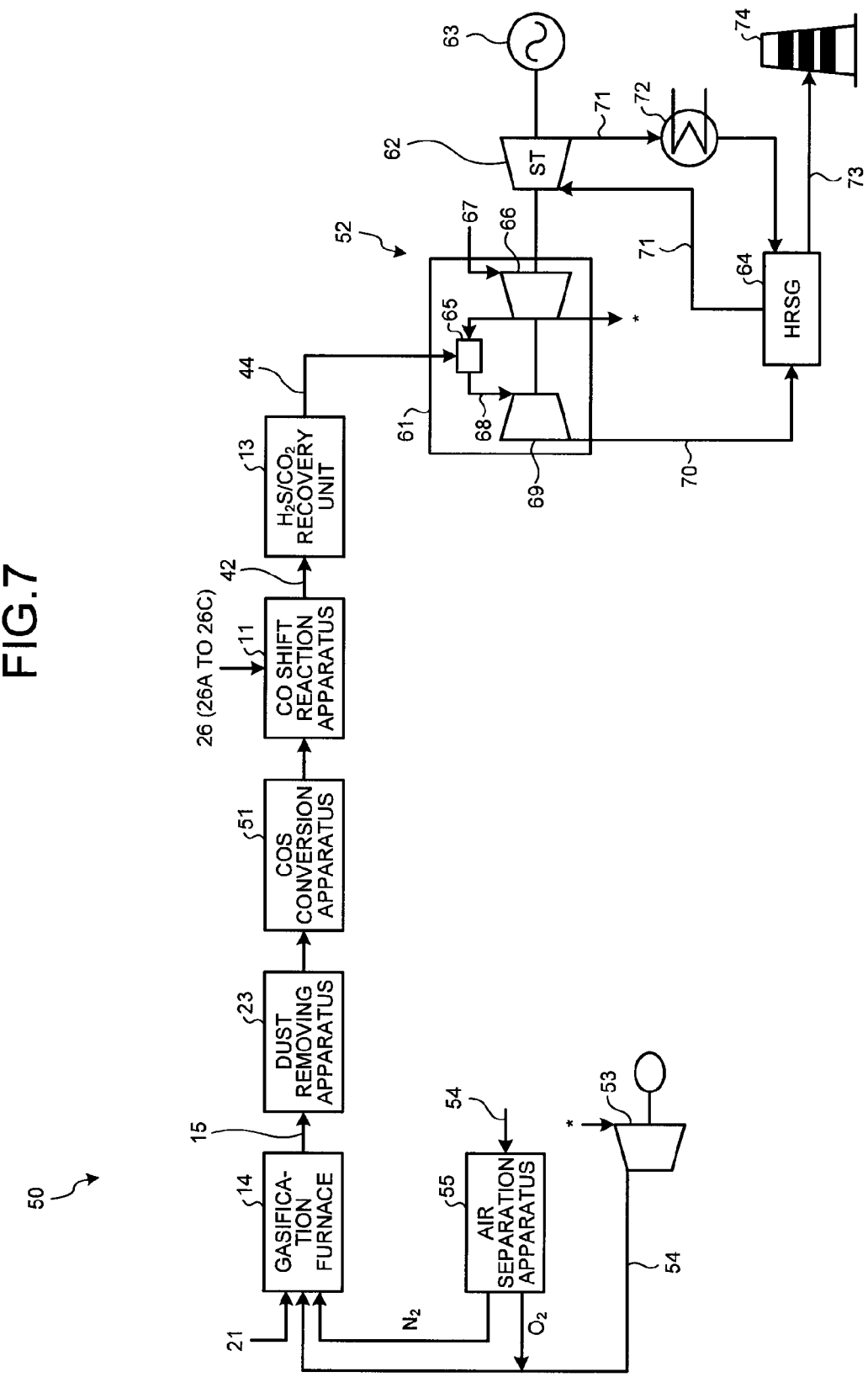
FIG. 7 is a diagram illustrating an example of a coal gasification power generation plant.

FIG. 7 is a diagram illustrating an example of the coal gasification power generation plant. As illustrated in FIG. 7, a coal gasification power generation plant 50 includes the gasification furnace 14, the dust removing apparatus 23, a COS conversion apparatus 51, the CO shift reaction apparatus 11, the $H_2S/CO_2$ recovery unit 13, and a combined power generation facility 52.

Coal 21 and air 54 from a gasification air compressor 53 are supplied to the gasification furnace 14 and the coal 21 is gasified by the gasification furnace 14, thereby obtaining the gasification gas 15 which is production gas. In addition, in the gasification furnace 14, the air 54 is separated into nitrogen ($N_2$) and oxygen ($O_2$) by an air separation apparatus 55, and $N_2$ and $O_2$ is appropriately supplied to the gasification furnace 14. The coal gasification power generation plant 50 supplies the gasification gas 15 obtained in the gasification furnace 14 to the dust removing apparatus 23 to remove dust and supplies the resultant to the COS conversion apparatus 51 so that COS contained in the gasification gas 15 is converted into $H_2S$. Thereafter, the gasification gas 15 containing $H_2S$ is supplied to the CO shift reaction apparatus 11 and a steam 26 (26A to 26C) is supplied into the CO shift reaction apparatus 11 so that the CO shift reaction occurs in which CO in the gasification gas 15 is converted into $CO_2$ in the CO shift reaction apparatus 11. The CO shift reaction apparatus 11, as described above, can efficiently produce the reformed gas 42 while suppressing the deterioration of the CO shift catalyst 34 and can flexibly cope with variations in the gas flow rate, the gas composition, and the like of the gasification gas 15. The reformed gas 42 obtained after converting CO in the gasification gas 15 into $CO_2$ in the CO shift reaction apparatus 11 is supplied to the $H_2S/CO_2$ recovery unit 13, and $CO_2$ and $H_2S$ in the reformed gas 42 is removed by the $H_2S/CO_2$ recovery unit 13.

The refined gas 44 after being processed by the $H_2S/CO_2$ recovery unit 13 is supplied to the combined power generation facility 52. The combined power generation facility 52 includes a gas turbine 61, a steam turbine 62, a power generator 63, and a Heat Recovery Steam Generator (HRSG)) 64. The combined power generation facility 52 supplies the refined gas 44 to a combustor 65 of the gas turbine 61 which is a power generation unit. In addition, the gas turbine 61 supplies air 67 supplied to a compressor 66 to the combustor 65. In the gas turbine 61, the refined gas 44 is combusted by the combustor 65 to produce high-temperature and high-pressure combustion gas 68, and a turbine 69 is driven by the combustion gas 68. The turbine 69 is connected to the power generator 63, and as the turbine 69 is driven, the power generator 63 generates power. Flue gas 70 produced after the turbine 69 is driven has a temperature of 500 to 600° C. and is thus sent to the Heat Recovery Steam Generator (HRSG)) 64 to recover thermal energy. In the heat recovery steam generator 64, steam 71 is produced due to the thermal energy of the flue gas 70, and the steam turbine 62 is driven by the steam 71. After being used by the steam turbine 62, the steam 71 is discharged from the steam turbine 62, is cooled by a heat exchanger 72, and is thereafter supplied to the heat recovery steam generator 64. In addition, flue gas 73 from which thermal energy is recovered by the heat recovery steam generator 64 is, after NOx or the like in the flue gas 73 is removed by a denitrification apparatus (not illustrated) or the like, discharged to the air via a stack 74.

As described above, the coal gasification power generation plant 50 provided with the CO shift reaction apparatus 11 according to this embodiment can efficiently produce the reformed gas 42 from the gasification gas 15 gasified in the gasification furnace 14 by converting CO contained in the gasification gas 15 into $CO_2$ while suppressing the deterioration of the CO shift catalyst 34 in the CO shift reaction apparatus 11 and can flexibly cope with variations in the gas flow rate, the gas composition, and the like of the gasification gas 15. Accordingly, the CO shift reaction is stably performed and thus the reformed gas 42 can be stably obtained. Therefore, the refined gas 44 can be produced more efficiently and stably, thereby efficiently and stably operating the coal gasification power generation plant 50.

In addition, the CO shift reaction apparatus 11 is not limited to the case where the CO shift reaction apparatus 11 is provided between the COS conversion apparatus 51 and the $H_2S/CO_2$ recovery unit 13 (on the front stage side of the $H_2S/CO_2$ recovery unit 13) and may also be provided on the downstream side of the $H_2S/CO_2$ recovery unit 13.

In this embodiment, the case where the refined gas 44 discharged from the $H_2S/CO_2$ recovery unit 13 is used as the gas for a turbine is described. However, since CO contained in the gasification gas 15 at a high ratio is converted into $CO_2$ in the CO shift reaction apparatus 11, the refined gas 44 may also be used as the raw gas for synthesizing chemical products such as methanol and ammonia other than the gas for a turbine.

While the case where the CO shift reaction apparatus 11 according to this embodiment converts CO in the gasification gas 15, which is produced by gasifying fuels such as the coal 21 in the gasification furnace 14, into $CO_2$ has been described, the present invention is not limited thereto and can also be applied to a CO shift reaction apparatus used in, for example, a fuel cell for converting gas that contains CO into $CO_2$, and the like.

REFERENCE SIGNS LIST

10 GASIFICATION GAS REFINING SYSTEM
11 CO SHIFT REACTION APPARATUS
12 WET FLUE GAS PROCESSING APPARATUS
13 $H_2S/CO_2$ RECOVERY UNIT
13A ABSORBER
13B REGENERATOR
14 GASIFICATION FURNACE
15 COAL GASIFICATION GAS (GASIFICATION GAS)
21 COAL
22 GASIFYING AGENT
23 DUST REMOVING APPARATUS
24A to 24C, 40A, 40B HEAT EXCHANGER
25 STEAM SUPPLY APPARATUS (STEAM SUPPLY unit)
26A to 26C STEAM
31A to 31C ADIABATIC REACTOR
31$a$ to 31$c$ GAS INLET PORT
39$a$ to 39$c$ GAS DISCHARGE PORT
32A, 32B FIRST GAS FLOW RATE CONTROL units
33A, 33B SECOND GAS FLOW RATE CONTROL units
34 CO SHIFT CATALYST
35A to 35C CO SHIFT CATALYST LAYER
36 GAS FRACTIONATION UNIT
37A, 37B GAS FLOW RATE CONTROL METER (FIC)
38A, 38B PROCESSING GAS
41A, 41B GASIFICATION MIXED GAS
42 REFORMED GAS (PROCESSED GAS)
43 REGENERATING HEATER
44 REFINED GAS
50 COAL GASIFICATION POWER GENERATION PLANT
51 COS CONVERSION APPARATUS
52 COMBINED POWER GENERATION FACILITY
53 GASIFICATION AIR COMPRESSOR
54 AIR
55 AIR SEPARATION APPARATUS
61 GAS TURBINE
62 STEAM TURBINE
63 POWER GENERATOR
64 HEAT RECOVERY STEAM GENERATOR (HRSG)
65 COMBUSTOR
66 COMPRESSOR
67 AIR
68 COMBUSTION GAS
69 TURBINE
70, 73 FLUE GAS
71 STEAM
72 HEAT EXCHANGER
74 STACK
$l_{11}$ to $l_{15}$ GAS SUPPLY LINE
$l_{21}$ to $l_{25}$ GAS DISCHARGE LINE
$l_{31}$, $l_{32}$ GAS DISCHARGE LINE
V11, V12 GAS FLOW RATE CONTROL VALVE
h1 to h3 LONGITUDINAL LENGTH OF CO SHIFT CATALYST LAYER
$F_{10}$ to $F_{14}$, $F_{20}$ to $F_{24}$, $F_{30}$ GAS SUPPLY AMOUNT

The invention claimed is:

1. A CO shift reaction apparatus comprising:
a plurality of reactors, each having CO shift catalyst layers filled with a CO shift catalyst which reforms CO in gas containing CO;
at least one gas supply line which supplies the gas to each of the reactors;
at least one first gas flow rate control unit which is provided in the gas supply line and adjusts a gas supply amount of the gas supplied to each of the reactors;
a gas discharge line which discharges processing gas in which CO in the gas is at least partially reformed, from the reactors;
at least one gas separation line which connects the gas supply line to the gas discharge line and extracts a part of the processing gas in the gas discharge line; and
at least one second gas flow rate control unit which is provided in the gas discharge line and adjusts a gas supply amount of the processing gas supplied to the gas discharge line and the gas separation line.

2. The CO shift reaction apparatus according to claim 1, wherein lengths of the CO shift catalyst layers are different from each other.

3. A gasification gas refining system comprising:
the CO shift reaction apparatus according to claim 1, which converts CO in gasification gas produced by gasifying coal as a raw material in a gasification furnace into $CO_2$ in the presence of the CO shift catalyst;
a wet flue gas processing apparatus which purifies the gasification gas after being subjected to a CO shift reaction in the CO shift reaction apparatus; and a refining apparatus which performs refinement by removing carbon dioxide and hydrogen sulfide from the gasification gas after being purified by the wet flue gas processing apparatus.

* * * * *